United States Patent
Benders et al.

(10) Patent No.: US 6,371,091 B1
(45) Date of Patent: Apr. 16, 2002

(54) SYSTEM FOR THE INTERMITTENT AND/OR SEQUENTIAL INTRODUCTION OF A GASEOUS FUEL

(75) Inventors: Jan Benders, Krimpen Aan De Ijssel; Antoine Van Doorn, Rotterdam, both of (NL)

(73) Assignees: Koltec B.V.; Necam B.V., both of Breda (NL)

(*) Notice: Subject to any disclaimer, the term of this patent is extended or adjusted under 35 U.S.C. 154(b) by 0 days.

(21) Appl. No.: 09/623,382

(22) PCT Filed: Mar. 3, 1999

(86) PCT No.: PCT/NL99/00113

§ 371 Date: Sep. 1, 2000

§ 102(e) Date: Sep. 1, 2000

(87) PCT Pub. No.: WO99/45250

PCT Pub. Date: Sep. 10, 1999

(30) Foreign Application Priority Data

Mar. 3, 1998 (NL) .............................................. 1008463

(51) Int. Cl.[7] .............................. F02B 7/06; F02B 43/00
(52) U.S. Cl. .................................... 123/527; 123/27 GE
(58) Field of Search ............................ 123/27 GE, 525, 123/527, 529, DIG. 12, DIG. 13

(56) References Cited

U.S. PATENT DOCUMENTS

| | | | |
|---|---|---|---|
| 4,020,810 A | * 5/1977 | Baverstock | 123/527 |
| 4,505,249 A | * 3/1985 | Young | 123/527 |
| 4,541,397 A | * 9/1985 | Young | 123/527 |
| 4,813,394 A | 3/1989 | St. Clair | 123/527 |
| 5,101,799 A | * 4/1992 | Davis et al. | 123/527 |
| 5,117,798 A | * 6/1992 | Nozaki | 123/527 |
| 5,146,903 A | * 9/1992 | Baverstock | 123/527 |
| 5,450,832 A | 9/1995 | Graf | 123/515 |
| 6,131,552 A | * 10/2000 | Paielli et al. | 123/527 |
| 6,145,495 A | * 11/2000 | Whitcome | 123/525 |
| 6,178,952 B1 | * 1/2001 | Lammerts et al. | 123/527 |

FOREIGN PATENT DOCUMENTS

| | | |
|---|---|---|
| EP | 0563223 | 10/1993 |
| JP | 6017709 | 1/1994 |
| NL | A9101106 | 1/1993 |
| WO | WO9639579 | 12/1996 |

* cited by examiner

Primary Examiner—Tony M. Argenbright
Assistant Examiner—Hai H. Huynh
(74) Attorney, Agent, or Firm—Young & Thompson

(57) ABSTRACT

The system includes a metering valve for each cylinder including a main valve and an auxiliary valve. The auxiliary valve is electrically controlled ad via a mechanical, pressure controlled amplifier mechanism, the main orifice in the metering valve is opened.

17 Claims, 2 Drawing Sheets

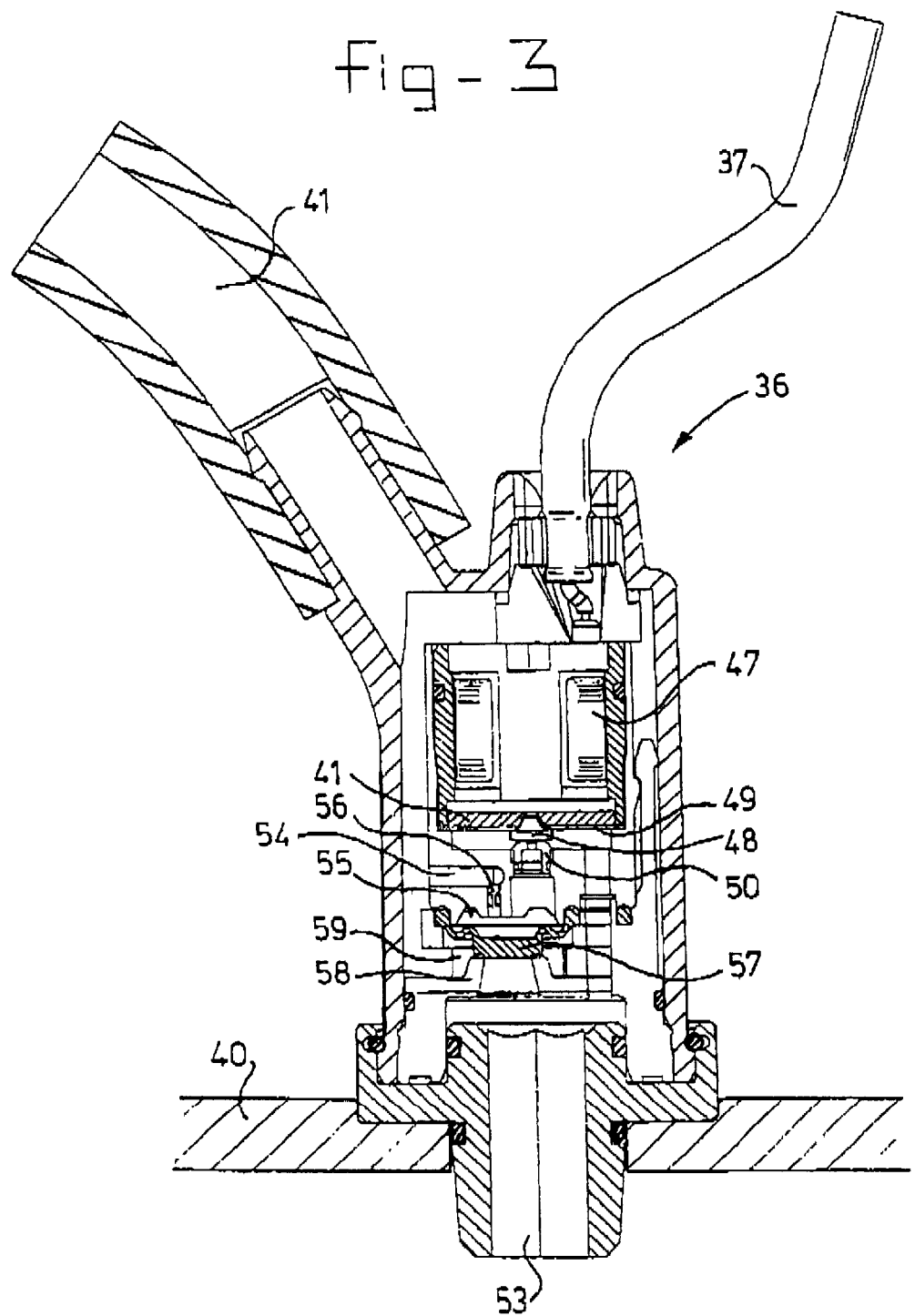

SYSTEM FOR THE INTERMITTENT AND/OR SEQUENTIAL INTRODUCTION OF A GASEOUS FUEL

FIELD OF THE INVENTION

The present invention relates to a system for the introduction of fuel in a multi-cylinder combustion engine.

BACKGROUND OF THE INVENTION

To provide an accurate dose to each of the cylinders, it is known that, a therein fitted common gas supply is used and that, with the help of a cut-off valve with various grooves, each of the cylinders is separately supplied with an accurately dosed quantity of gas, wherein the position of the grooves are electrically controlled and determine how much gas is injected. If such a system is connected in closed loop with a λ-probe, the present environmental requirements can be met. An example of this can be found in the European patent 0.563,223.

However, increasingly higher requirements are being put on the optimal fuel mixture, under changing circumstances. This can include the changing of the number of revolutions, for example, and the load of the internal combustion engines.

In gasoline driven internal combustion engines, controls have been developed for the intermittent or sequential introduction of (liquid) gasoline. If intermittent control takes place at an equal or higher frequency than the camshaft revolutions of the combustion engine, this control offers the possibility of supplying the optimal quantity of fuel for each combustion cycle, This is because the period required for the fuel supply is shorter than the cycle time of the combustion engine. During the switching on and off of the fuel supply, problems can occur, however, in supplying the correct quantity of fuel to the separate cylinders. By simultaneously switching the fuel supply of several cylinders on or off one or more of the cylinders receives only a part of the required fuel, whereby an incorrect mixture can result. If the control is completely sequential, that is, for each separate cylinder the correct quantity of fuel at the correct time, then the dose can also be correctly supplied during the switching on and off of the fuel supply.

Apart from the advantage when starting and switching off, further reductions in the emissions are achieved by sequential control by the introduction of the fuel taking place at the most optimal time for the particular cylinder.

From the 'SAE Technical Paper Series' 951913 'Ultra Rapid Natural Gas Port Injection', a multi-point sequential injection system for natural gas (methane) is known. The injector used there has a disk formed metallic valve which is operated by a coil,

SUMMARY OF THE INVENTION

Such a system functions only with a comparatively high pre-pressure (several bars), requires a considerable electrical power whereas the wear is not negligible and is higher than the lifetime of the other engine components. The dimensions of the coil, in particular, are a hindrance to realizing this construction. After all, in the modern combustion engine there is limited space available for (afterwards) fitting of injectors for gaseous fuel and a there must be a significant freedom in the installation position. By intermittently or sequentially injecting greater freedom is achieved with respect to the valve timing and manifold geometry.

The object of the present invention is to avoid the above mentioned disadvantages.

It has been found that with a comparatively simple auxiliary/main valve-construction, switching is possible at particularly high frequencies, without non-permissible deviations from the opening characteristic of the main valve occurring. This construction also gives a greater freedom with regards to the seating dimensions of the main valve and to the working pressure.

It is noted that from the Dutch application 9101106 a dosing valve is known for pneumatic purposes. There, an auxiliary valve is used which is connected on one side to the gas outlet. The other side of the auxiliary valve is not directly connected to the gas supply, but a membrane is connected in between. It is assumed that by the underpressure in the outlet when the auxiliary valve is open, the membrane is sucked away from the supply so that a greater supply is released. From that known construction the membrane closes off two small pipes which are connected via a channel with the other side of the membrane and so provides the control. It is therefore possible that, during the closing movement of the membrane to the small pipes in particular, a time-lag effect is created which can culminate in a strutter behavior.

Such a construction is aimed for central introduction of fuel with a mixer, whilst the subject application aims the use of one or more injectors for each cylinder (multipoint injection).

According to a further advantageous embodiment of the invention, a controller is present for the separate control of each of the dosing valves depending on the operational conditions of that internal combustion engine.

According to an advantageous embodiment of the invention the auxiliary valve is directly connected on one side with the gas supply and on the other side to the gas outlet, wherein the volume of the main valve is connected with the gas supply through a restriction, More particular the main valve comprises a membrane controlled valve, wherein on one side of the membrane the gas supply pressure acts through a restriction and wherein over a part of the other side of the membrane the same gas supply pressure acts and on a further part of said other side the gas outlet pressure applies.

According to a further advantageous embodiment, the gas outlet of the main and auxiliary valves is shared.

The membrane can comprise any material known in the art and in particular rubber materials are preferred. The auxiliary valve can be any valve known in the state of the art, such as a needle valve or a disc valve.

According to an advantageous embodiment of the invention, the main valve and auxiliary valve are made such that a maximum of 30% of the total amount of gas flows through the auxiliary valve and a minimum of 70% through the main valve.

BRIEF DESCRIPTION OF THE DRAWINGS

The invention will be elucidated further below with reference to an example embodiment shown in the drawings. These show.

DETAILED DESCRIPTION OF THE INVENTION

Figure 1:
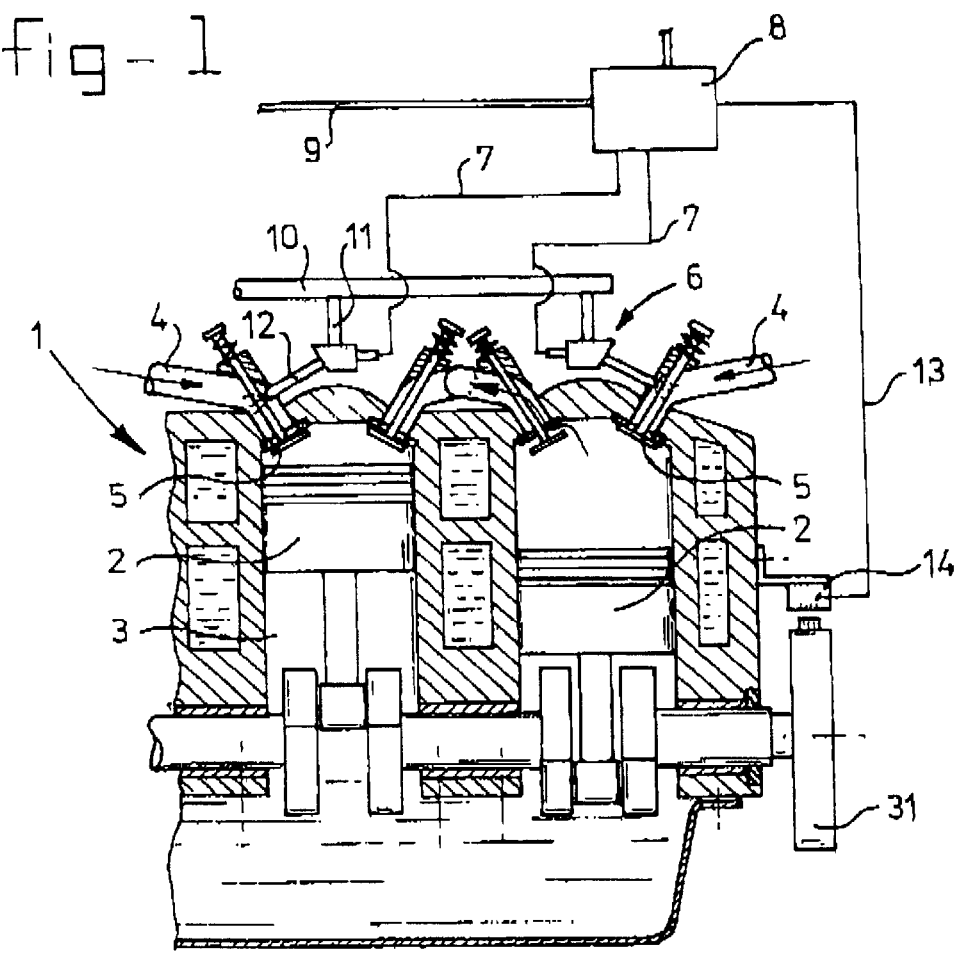
FIG. 1 very schematically, a part of an internal combustion engine provided with the system according to the invention.

In FIG. 1 an internal combustion engine is shown and generally referred to with 1. Only an application of the system in combination with this internal combustion engine is shown it will be understood that a system working on gasoline can be present, wherein, possibly, any sensors present can be shared.

Various pans of the internal combustion engine are schematically shown and these consist of at least two pistons 2 and two cylinders 3. Inlet valves 5 are fitted in the inlet channels 4, Upstream from the inlet valves is always an intake 12 present for gas which via a dosing valve 6 is connected to a branch 11 of the gas supply 10. It is not shown how gas 10 is supplied. This can be via an evaporator or any other construction known in the art. It will be understood that the internal combustion engine can comprise a mobile as well as a stationary engine.

Figure 2:
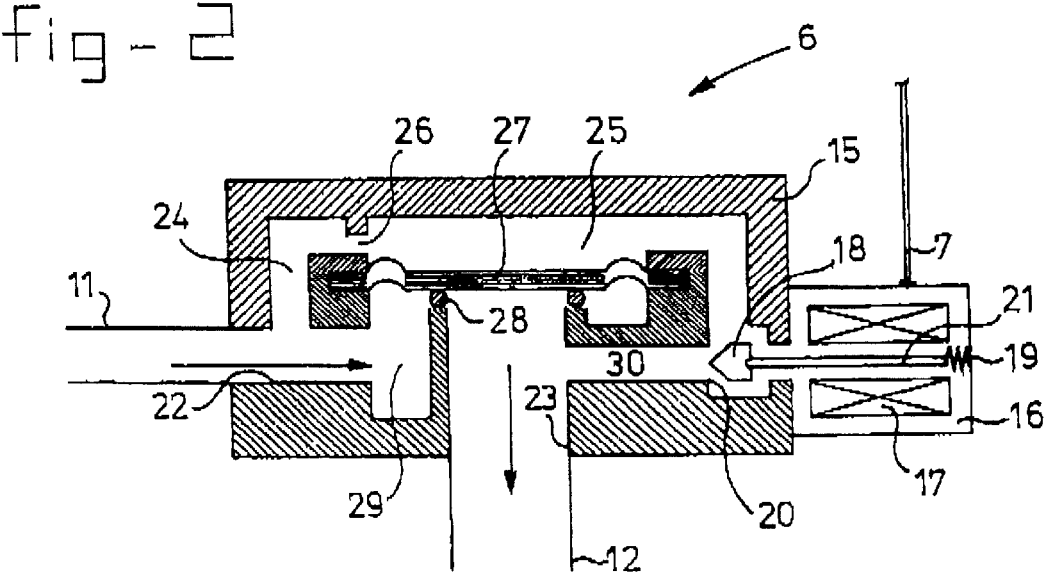
FIG. 2 further elaborated, the dosing valve which is incorporated in that system, FIG. 3 a design of the dosing valve according to the invention, used in practice.

As can be seen in FIG. 2, the dosing valve 6 (injector) comprises a main valve and an auxiliary valve wherein the auxiliary valve is electrically controlled via a cable 7 which is connected to controller 8. In controller 8 more cables come together such as cable 9, connected to other engine sensors (not shown).

Such sensors can for example be fitted on the cam shaft and/or the crank shaft to accurately establish the position of the engine 1. It is also possible to tap signals from a controller already present in the engine, such as for gasoline-injection. Cable 13 is connected to sensor 14 which observes the position of the flywheel 31 of the internal combustion engine.

In FIG. 2 a dosing valve 6 is further elaborated. This shows that the branch 11 passes into gas intake 22 of housing 15. A gas outlet 23 is also fitted in housing 15 which passes into gas outlet 12. An auxiliary valve 16 is fitted on the side of housing 15. This consists of a stationary electrical coil 17 which is operated via an electrical cable 7. Inside is a stem 21 of a needle valve 18 which can be moved back and forth by the interaction of the magnetic force generated by the coil 17 and spring 19. The needle valve 18 works on a valve seating 20 which leads to an outlet channel 30.

Housing 15 is separated into a chamber 25 and a ring shaped chamber 29. Separation of these two chambers is realized by membrane 27. Gas intake 22 is directly connected on one side with chamber 29 and on the other side, via restriction 26 is connected to chamber 25, Chamber 25 is connected on the other side with the needle valve 18. Moreover the membrane 27 is connected to gas outlet 23.

The construction described with reference to FIG. 2 functions as follows:

If the needle valve 18 is closed, the membrane 27 will be pressed against sealing ring 28, due to the dimensions of the various surfaces ,since the gas outlet 23 generally has a lower, but in any case never a higher, pressure than the gas supply pressure. Gas can therefore, neither via membrane 27 nor via the closed needle valve 18 or gas intake 22, get into gas outlet 23.

If a gas flow to gas outlet 23 is required, auxiliary valve 16 is opened by the energizing of coil 17. Consequently, gas will flow from gas intake 22, via restriction 26 along the needle valve 18 into channel 30. Due to the presence of under-pressure in outlet 23 (intake pressure) and restriction 26, the pressure in chamber 25 will be lower than the gas supply pressure that is, the pressure in chamber 29. Consequently the membrane 27 will move upwards and a direct flow from chamber 29 to gas outlet 23 will take place.

If the needle valve 18 then closes, the pressure above membrane 27, that is in chamber 25, will rise because the effect of the restriction 26 is nullified. Consequently membrane 27 will again be pushed against ring 28.

During tests it appeared that such a construction can be switched at very high speeds. Tests were done to several hundred Hertz, wherein no problems were encountered. With a normal fast rotating internal combustion engine working with the four-stroke principle, the frequency in practice will be approximately 20 Hz and the maximum driving frequency will be between 60 and 70 Hz for high revolution engines AS the movement of the membrane does not have any influence on its control, as for the construction described in the Dutch patent application 9101106, the possible accompanying lag effect will not be present. That is, the gas supplied via the constriction 26 that results in a build up of pressure on the membrane 27 for a closed cut-off valve, is not lead through a restriction which depends on the position of the membrane. Due to this, a well defined opening and shutting movement can be guaranteed.

It will be understood that, by using suitable dimensions for the various channels and surfaces and the prevailing pressure on both sides of the membrane 27 and outlet of the restriction 26, the opening and shutting speed of the membrane can be controlled. These and further variations are clear to those skilled in the art after reading the preceding description and are within the scope of the attached claims. With the construction according to the present invention, it is not necessary to supply the gas under high pressure. After all, the main valve has a large enough surface to also enable the introduction of gas at a comparatively low pressure, so that no problems are caused during use with gases containing butane wherein, at a high pressures the danger of transferring the liquid phase is present. The main outlet 23, described above, can have a diameter of 3 mm for example, while the applied gas pressure can be approximately 1–2 bar over-pressure.

By simply varying the diameter, for example, by placing other rings or spacers in the 2–4 mm range, the valve can be adapted to a particular type of fuel and/or combustion engine.

It has been found that with a gas supply of approximately 5% volume through the auxiliary valve and passage of at least 95% volume of gas through the main valve, a sufficiently accurate control of the main valve can be achieved. This means that the auxiliary, valve can be produced in a particularly small and fast reacting format.

It will be understood that the relationship between the amount of gas that flows through the auxiliary valve and the amount which flows through the main valve is extremely dependent on the operational conditions. If the opening/closing movement takes up a comparatively large part of the opening time, the percentage of gas that flows through the auxiliary valve will considerably differ from the situation where the closing time of the various valves with respect to the opening/closing time is less relevant. Furthermore it will be understood that various auxiliary valves are connected behind each other to realize a stepped 'amplifier'.

With the construction according to the invention, only a small amount of electrical power is required to drive it, in contrast to the intermittent multipoint gas injectors currently on the market.

In FIG. 3, a practically realized embodiment of the construction according to the invention is shown. This is generally indicated by 36, The electrical driving cable is indicated by 37 and is connected with a controller (not shown), This provides a coil 47 with energy. The coil is provided with an armature plate 41 which is moved towards the coil when this is energized. These movements arc counteracted by a diaphragm spring 49. The actual cut-off valve is indicated by 48 and consists of a rubber material that seals against a sitting 50. Gas is brought in by pipe 41 and flows around coil 47. This results in this coil 47 being provided with cooling. Gas goes through channel 54 and restriction 46 to get into chamber 55 above membrane 57. This membrane 57 seals with respect to the sealing edge 58 where a chamber 59 can also be found. The gas outlet is indicated by 53 and this leads to a schematically shown part of an intake manifold 40.

FIG. 3, shows that the apparatus can be extremely compactly built. It has proven technically possible to make the diameter of the main parts of the embodied apparatus smaller than 2 cm.

While the invention above is described with reference to a few preferred embodiments, it will be understood that changes can easily be made which are clear to persons skilled in the art and are within the scope of the attached claims.

What is claimed is:

1. System for the intermittent and/or sequential introduction of gaseous fuel in a multi-cylinder combustion engine, comprising:

a separate main supply of gaseous fuel for each cylinder of said combustion engine; and a metering valve fitted in each cylinder, wherein said metering valve comprises a main valve and at least one auxiliary valve which, through a pressure difference across the metering valve controls the main valve arranged in said metering valve.

2. System according to claim 1, comprising a control for the separate, controlling of each of the metering valves, depending on the operation conditions of said internal combustion engine.

3. System according to claim 2 wherein the control is connected to an engine position sensor.

4. System according to claim 1 wherein the auxiliary valve can connect the volume of the main valve on one side to the gas supply on the other side to the gas outlet.

5. System according to claim 1 wherein said auxiliary valve is on one side connected to the volume of the main valve and on the other side is connected to the gas outlet whereby the volume of the main valve is connected to the gas outlet via a restriction.

6. System according to claim 1 wherein the main valve comprises a membrane controlled cut-off valve, wherein on one side of the membrane the gas supply pressure applies via a restriction and whereby over a part of the other side of the membrane the same gas supply pressure applies and on a further part of that other side, the gas outlet pressure applies.

7. System according to claim 6 wherein said membrane comprises a rubber material and/or synthetic material.

8. System according to claim 1 wherein the gas outlet of the main valve and auxiliary valve is shared.

9. System according to claim 1 wherein the main and auxiliary valves are made such that a maximum of 30% of the total amount of gas flows through the auxiliary valve and a minimum of 70% flows through the main valve.

10. A metering valve for the intermittent and/or sequential introduction of gaseous fuel in a multi-cylinder combustion engine, the metering valve comprising:

a housing defining a chamber;

a gaseous fuel inlet fitted into the housing;

a gaseous fuel outlet fitted into the housing;

passages within the chamber for the flow of gaseous fuel from the inlet to the outlet;

a main valve fitted within the housing for controlling gaseous fuel flow through a first of the passages; and an auxiliary valve fitted into the housing for controlling flow of gaseous fuel through a second of the passages.

11. The metering valve according to claim 10, wherein the auxiliary valve can connect the volume of the main valve on one side to a gaseous fuel supply on the other side to the gaseous fuel outlet.

12. The metering valve according to claim 10, wherein the auxiliary valve is on one side connected to the volume of the main valve and on the other side is connected to the gaseous fuel outlet whereby the volume of the main valve is connected to the gaseous fuel outlet via a restriction.

13. The metering valve according to claim 10, wherein the main valve comprises a membrane controlled cut-off valve, wherein on one side of the membrane the gas supply pressure applies via a restriction and whereby over a part of the other side of the membrane the same gas supply pressure applies and on a further part of that other side, the gas outlet pressure applies.

14. The metering valve according to claim 13, wherein the membrane comprises a rubber material and/or synthetic material.

15. The metering valve according to claim 10, wherein the gaseous fuel outlet of the main valve and auxiliary valve is shared.

16. The metering valve according to claim 10, further comprising a control connected to an engine position sensor.

17. The metering valve according to claim 10, wherein the main and auxiliary valves are made such that a maximum of 30% of the total amount of gaseous fuel flows through the auxiliary valve and a minimum of 70% flows through the main valve.

\* \* \* \* \*